(12) United States Patent
Cowelchuk et al.

(10) Patent No.: US 7,170,400 B2
(45) Date of Patent: Jan. 30, 2007

(54) SYSTEM FOR CUSTOMIZING SETTINGS AND SOUNDS FOR VEHICLE

(75) Inventors: Glenn A. Cowelchuk, Chesterfield, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 152 days.

(21) Appl. No.: 10/850,256

(22) Filed: May 20, 2004

(65) Prior Publication Data

US 2005/0261815 A1 Nov. 24, 2005

(51) Int. Cl.
*B60Q 1/00* (2006.01)

(52) U.S. Cl. ............ 340/438; 340/426.14; 340/426.16; 340/825.22; 340/825.24; 340/825.25

(58) Field of Classification Search ................ 340/438, 340/426.14, 426.16, 825.5, 825.22, 825.24, 340/825.25, 825.28; 701/36, 37, 45, 86, 701/108, 109
See application file for complete search history.

(56) References Cited

U.S. PATENT DOCUMENTS

| | | | |
|---|---|---|---|
| 5,471,576 A * | 11/1995 | Yee | 715/500.1 |
| 5,796,176 A * | 8/1998 | Kramer et al. | 307/10.1 |
| 6,323,566 B1 | 11/2001 | Meier | |
| 6,330,497 B1 * | 12/2001 | Obradovich et al. | 701/1 |
| 6,663,010 B2 | 12/2003 | Chene et al. | |
| 6,670,905 B1 * | 12/2003 | Orr | 342/20 |
| 6,775,603 B2 * | 8/2004 | Yester et al. | 701/36 |
| 2002/0057020 A1 | 5/2002 | Caldwell | |
| 2002/0140289 A1 | 10/2002 | McConnell et al. | |
| 2003/0061746 A1 | 4/2003 | Huang | |
| 2003/0078709 A1 | 4/2003 | Yester et al. | |
| 2003/0130822 A1 | 7/2003 | Steele | |
| 2003/0220722 A1 | 11/2003 | Toba et al. | |

FOREIGN PATENT DOCUMENTS

WO 2004/074047 9/2004

* cited by examiner

*Primary Examiner*—Hung Nguyen
(74) *Attorney, Agent, or Firm*—MacMillan, Sobanski & Todd, LLC

(57) ABSTRACT

A system for customizing vehicle settings includes a control unit adapted to communicate with a vehicle input source and a vehicle auxiliary device. The system further includes a data storage device in communication with the control unit for storing and retrieving audio electronic data for customizing sounds related to the actuation of the vehicle input source. The data storage device is further capable of storing and retrieving non-audio electronic data for customizing settings for the vehicle auxiliary device. The control unit is adapted to communicate with at least one input device for uploading the audio and non-audio data stored in the data storage device data.

20 Claims, 2 Drawing Sheets

SYSTEM FOR CUSTOMIZING SETTINGS AND SOUNDS FOR VEHICLE

BACKGROUND OF THE INVENTION

This invention relates in general to vehicles and a system for programming, modifying, and/or saving settings related to various parameters of the vehicle interior.

Most vehicles have various user operated controls that cause a sound to be emitted when actuated to provide feedback to the driver that their action of operating the control is being carried out. For example, operation of a turn signal mechanism may cause an audible signal, such as a continuous series of sounds, to be emitted while the turn signal mechanism is being actuated. This audible signal is preprogrammed by the manufacture of the vehicle and is not changeable by the purchaser/driver of the vehicle.

Most vehicles also have several alerts and notifications that typically have an associated sound or visual data corresponding thereto. These alerts sound automatically when a given vehicle condition is detected to call attention thereto. Often, the alerts and sounds for user operated controls are provided for the safety and convenience of the driver and other vehicle passengers. The sounds associated with the various vehicle events are typically beeps, ringing, or buzzing sounds. Although the sounds have been effective to notify drivers and other passengers of the vehicle of given events, it would be advantageous to allow users to modify these sounds to provide notifications that are more pleasing to the user.

Also within the passenger compartment of the vehicle are various devices that are positionable by the user and other passengers. These devices can include seats, mirrors, pedals, the steering wheel, etc. These various devices are typically positioned for the safety and convenience of the users. It is known in the art to have these devices be automatically positioned based on user preset settings. The automatic positioning can be accorded by any driver recognition mechanism. The typical mechanisms include a key fob or user operable buttons on an instrument panel. Depressing a button on either the key fob or instrument panel operates various actuators that mechanically move the various devices.

SUMMARY OF THE INVENTION

This invention relates to a system allowing a user to customize the sounds and settings of various vehicle components. The system for customizing vehicle settings includes a control unit adapted to communicate with a vehicle input source and a vehicle auxiliary device. The system further includes a data storage device in communication with the control unit for storing and retrieving audio electronic data for customizing sounds related to the actuation of the vehicle input source. The data storage device is further capable of storing and retrieving non-audio electronic data for customizing settings for the vehicle auxiliary device. The control unit is adapted to communicate with at least one input device for uploading the audio and non-audio data stored in the data storage device data.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
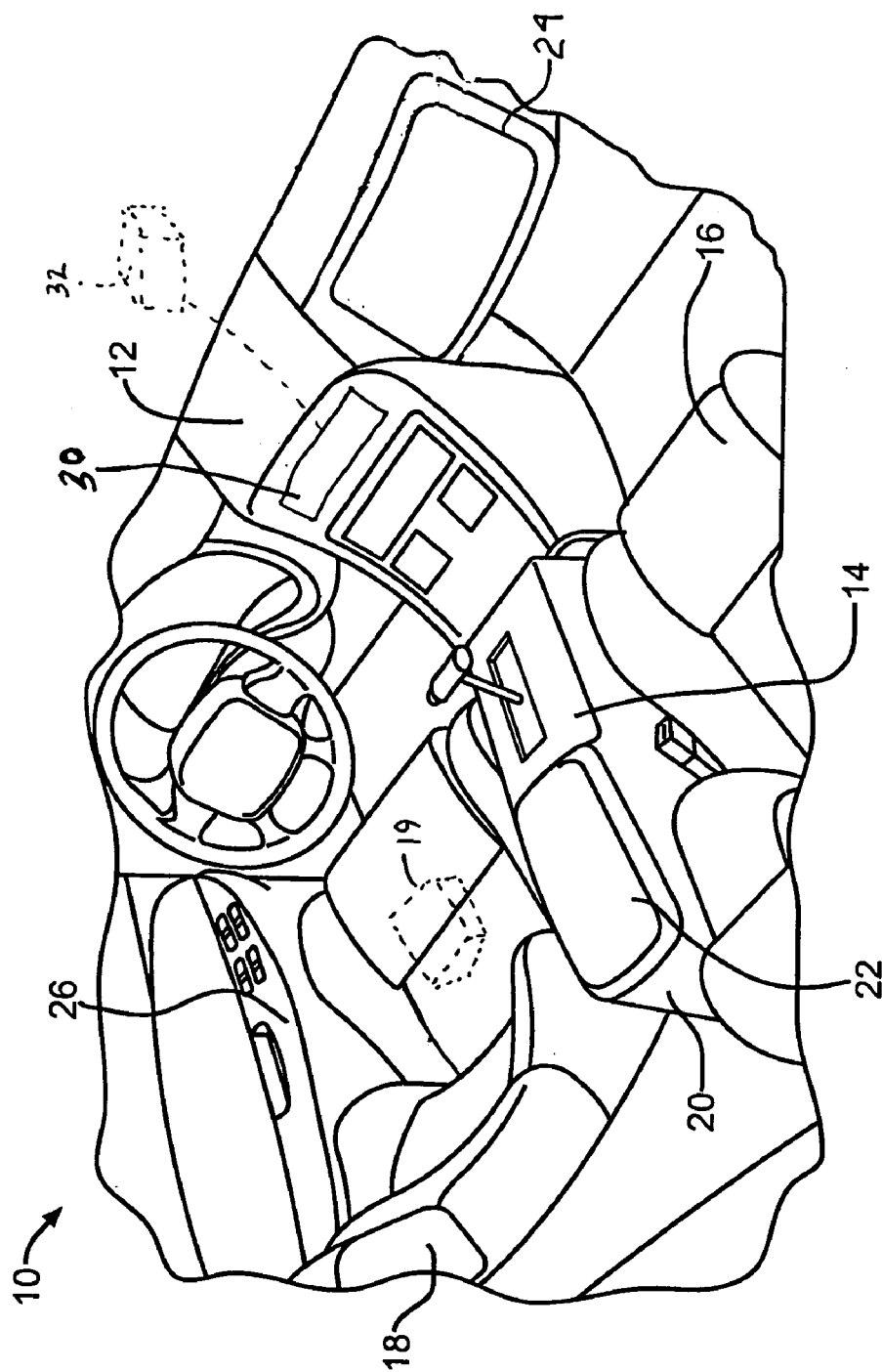
FIG. 1 is a view of the interior of a passenger compartment of a vehicle having a vehicle customization control unit according to the present invention.

Referring now to the drawings, there is illustrated in FIG. 1 a portion of an interior passenger compartment of a vehicle, indicated generally at 10. The illustrated vehicle interior passenger compartment 10 is, in large measure, conventional in the art and is intended merely to illustrate one environment in which this invention may be used. Thus, the scope of this invention is not intended to be limited for use with the specific structure for the vehicle interior passenger compartment illustrated in FIG. 1 or with vehicle interior passenger compartments in general. On the contrary, as will become apparent below, this invention may be used in any desired environment for the purposes described below.

The vehicle interior passenger compartment 10 includes an instrument panel or dashboard 12. Positioned within the instrument panel 12 are various visual gauges for the driver's convenience. The instrument panel 12 may also include control mechanisms for various components of the vehicle, such as for example, a temperature and climate controls system, audio and video systems, seat and mirror position mechanisms, and navigational systems. These controls may be positioned within the instrument panel 12, a lower console 14, doors 26, or any other suitable location within the interior of the vehicle. The lower console 14 is positioned between a passenger seat 16 and a driver seat 18 and may include a storage compartment 20 that has a lid 22 that can also serve as an armrest. The storage compartment 20 can be accessed by lifting the armrest lid 22. It will be appreciated that the storage compartment 20 may extend into a rear passenger seating area (not shown) of the vehicle interior passenger compartment 10. Alternatively, a second storage compartment (not shown) may be provided in the back seat area and can also have various controls (climate, windows, video gaming device controls, audio controls, headphone jacks, etc.) located thereon. An overhead console (not shown) can also be accessible from within the interior passenger compartment of the vehicle. The overhead console can contain various controls, such as a garage door opener, climate controls, etc. The overhead console can also contain storage compartments for sunglasses, portable media, or a mobile phone. A rear overhead console can include a video display screen, climate controls, and other audio controls. Also located within the passenger compartment is a storage compartment or glove box 24 that may be partially or completely disposed within the instrument panel 12.

Within the vehicle interior passenger compartment 10 there are a number of user modifiable settings that are usually set depending on the preferences of the driver. These settings typically include seat positions for the vehicle driver seat 18 (fore/aft position, seat height, seat back angle, etc.), audio and video presets, rearview and side view mirror positions, temperature control settings, seat belt height, steering wheel position, accelerator/brake pedal positions, interior light colors and intensity, airbag activation and sensitivity conditions, and many other settings. Several of these components can be controlled electronically by actuators. For example, a seat position actuator is indicated schematically at 19 and can be adapted to control movement of the vehicle seat relative to the chassis of the vehicle as well as for changing the height, angle and other relative positions between the seatback and seat bottom. Similarly, an actuator can be connected to the side view mirrors for changing the positions thereof. It should be appreciated that this list of customizable features is not exhaustive. Many of these parameters are set for the safety and convenience of the driver. However, some of the settings can be set solely for aesthetic or comfort reasons, or a combination thereof.

Preferably, the vehicle passenger compartment 10 also includes a vehicle settings control unit interface 30 positioned therein which is accessible to an operator of the vehicle from within the interior passenger compartment. The control unit interface 30 is preferably used to control, set, monitor, or modify the settings of one or more of the above parameters. The control unit interface 30 can include any suitable control mechanisms and switches to input the desired settings by a user. The interface 30 may also include a display screen or other visual indicators for informing the user of the current setting. As will be described in further detail below, various sound settings can also be customized to the preferences of the driver or other passengers of the vehicle in accordance with the present invention.

Figure 2:
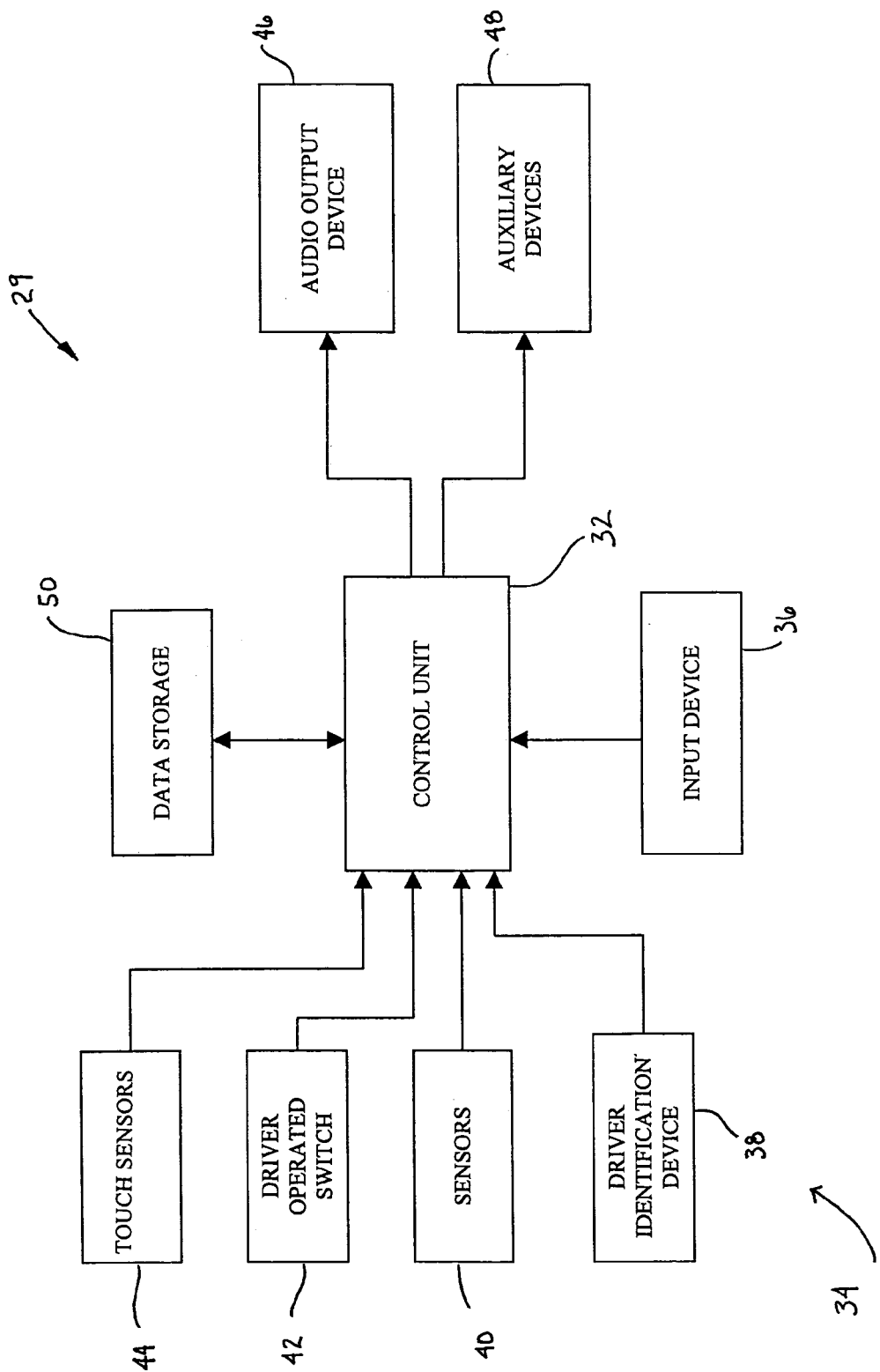
FIG. 2 is a block diagram of a system for customizing vehicle settings in accordance with this invention.

Illustrated in FIG. 2 there is shown a block diagram of a system 29 for customizing vehicle settings and/or sounds, such as those described above. The system 29 includes an electronic control unit 32. The electronic control unit 32 is preferably adapted to receive input signals from a plurality of sources or devices, such as those indicated generally at 34. In the preferred embodiment, the input sources 34 include at least one audio input device 36, a driver identification device 38, vehicle condition sensors 40, driver operated switches 42, and touch sensors 44 (e.g. field effect sensors). The control unit 32 can also send signals to control any number of outputs including audio output devices 46 and auxiliary devices 48. Also in communication with the control unit 32 is a data storage unit 50 adapted to be a repository of electronic data pertaining to the customized vehicle settings.

The control unit 32 includes a processing means that can be programmed to perform a number of functions. Among these functions is the operation wherein the control unit 32 detects whether input signals are ordering the control unit 32 to process data, store data in the data storage unit 50, retrieve data from the data storage unit 50, and send data and actuation signals to the audio output device 46 and auxiliary device 48. It should be appreciated that although a single audio output device 46 and single auxiliary device 48 are shown, any number of audio output devices and auxiliary devices can be implemented in the system according to the present invention.

The processing means of the control unit 32 can also determine if the data it is receiving for storage from any of the data sources 34 is in an appropriate storable format. For audio data, it is preferred that the data is in a digital compression format, including formats such as WMA (Windows Media Audio), OGG Vorbis™, ATRAC (Adaptive Transform Acoustic Coding), MLP (Meridian Lossless Packing), AC-3 (Audio Compression-3), MP3 (Moving Picture Expert Group 1 Audio Layer-3), and MP3Pro. It should be appreciated that any audio format, such as MIDI, WAV, and other sound data can also be used in combination with the control unit and processing means of the invention. If the processing means determines that the data is in an appropriate storable format, the processing means can store the data within the data storage unit 50. If the processing means determines that the data is in a format that is not in an appropriate storable format, the processing means can encode the data into a storable format, and can store the files within the data storage unit 50. It can be appreciated that non-audio data can also be transferred from the data sources 34 to the control unit 32. For example, seat and mirror positions, temperature controls, etc. can be input to the control unit 32 for processing or storage, in conjunction with the audio related information. Additional uses for the stored data will be described in greater detail below.

In the preferred embodiment, the data from any of the data sources 34 can be stored via the control unit 32 in the data storage unit 50. The data storage unit 50 may include a hard drive, although any suitable storage device can also be used. A preferred embodiment of the data storage unit 50 is flash memory. Alternatively, a hard drive may be used which may be any magnetic media device capable of storing data, including a conventional Winchester disk drive, a cartridge drive, or a microdrive, such as is available from Pockey Drives or Iomega®. In a preferred embodiment, the hard drive is an embedded hard drive, such as a 1.8-inch Type II PC Card hard disk drive from Toshiba®. The processing means of the control unit 32 may be adapted to store the files in a storable format within the hard drive, or an alternate memory device such as a magnetic, optical, or fixed flash memory device, and solid-state floppy disk card, or both a hard drive and alternate memory device. Thus, the data storage unit 50 may record the data on a portable media device which may be transferred to another vehicle or used with a remote computer.

The processing means of the control unit 32 is configured to read data from any number of data sources or input devices 36. The control unit interface 30 can be adapted to receive data input from any suitable input device 36, or alternatively act as the input device 36, as indicated in the block diagram of FIG. 2. The input device may include any memory device suitable for storing digital data. The input device 36 may be any memory device, including a magnetic, optical, or removable flash memory device or solid-state floppy disk card, such as CompactFlash Type I or Type II developed by Sandisk®, SD™ (Secure Digital) by Sandisk®, Smart Media developed by Toshiba, Memory Stick® developed by Sony, xD-Picture Card by Fuji, the micro-optical media available from Data Play, or any PCMCIA Type I or Type II memory card or memory stick. In a preferred embodiment, any of the input devices 36 listed above can be combined with a key chain fob so that the input device 36 is transported within or adjacent the key chain fob. In an alternate embodiment, the input device 36 could be a compact disc (not shown) loaded within a compact disc drive installed in the vehicle. Alternatively, the control unit 32 can be adapted to receive information via a wireless or wired communication port or jack, formed on the control unit interface 30, capable of transferring data in any suitable format. The communication port 32 may be any suitable communication port, such as a USB (Universal Serial Bus) port, a wired network port, Bluetooth, IrDA (Infrared Data Association), Fire Wire (IEEE 1394 High Performance Serial Bus), Wi-Fi (Wireless Fidelity) or HomeRF, or other wireless port compliant with IEEE 802.11A, 802.11B, or 802.11G specifications.

The control unit 32 may be adapted to communicate with an external computer through the communication port. The external computer may function as an input device 36 and can be any external device, such as a personal computer, a personal digital assistant (PDA), an MP3 player, CD player, cell phone, or a server. In a preferred embodiment, the control unit 32 may also exchange stored files with any of the data input devices listed above. For example, a user may be able to upload audio data to the data storage unit 50 via an input device, such as a personal computer. The computer can access a software program or the Internet having a plurality of audio tracks or sounds. The user would select the desired audio track, for each particular function of an input source 34 or auxiliary device 48, e.g. turn signal indicator. Thus, the program or Internet site may include an interface for easily selecting a desired audio track with a particular function of an input source 34. The personal computer could be connected with a flash memory device for saving the audio data information and corresponding function to a flash memory card. The flash memory card can then function as the input device 36 for uploading the audio information into the data storage 50 via the control unit 32. Alternatively, the flash memory card itself may the data storage unit 50.

In the preferred embodiment of the invention, the vehicle user can use any of the input devices 36 to upload audio data from the input device 36 to the control unit 32. The control unit can then store the audio data in the data storage unit 50 as was described above. The audio data preferably is assigned to the various settings of the vehicle by the control unit 32 via the control unit interface 30 or based on data transferred from the input device 36. As stated above, vehicle sounds related to certain user operable devices or vehicle functions are optionally customizable by the vehicle operator. Thus, the control unit 32 is controllable, such as via the control unit interface 30, to change the designated sound associated with the operation of an input source 34. For example, sounds associated with turn signals, as well as for general alerts such as an ajar door, low fuel, hazards, seat belts, low tire air pressure, and scheduled maintenance can be modified to alert the driver using sounds as selected by the driver. Thus, the driver of a vehicle is able to change the selected sound which is associated with input source 34. It can be appreciated that any sound parameter of the vehicle, in addition to those listed above, can be modified according to the present invention. In the preferred embodiment, songs, portions of songs, musical notes, sound effects, or any other desired type of audio can be associated with any of the customizable events and devices to inform the vehicle operator of the actuation of a particular device or the occurrence of a given event. It can further be appreciated that to multiple sounds can be associated with the same device such that a unique sound is broadcast under different conditions for the same device. For example, a right turn signal can have a first associated audio signal that sounds when the turning stalk is selected. The audio associated with that turn signal can change to a second associated audio signal when the turning stalk returns to a neutral position, or can broadcast a third associated audio signal if the turning stalk remains in the actuated position beyond a predetermined duration of time. Also, the audio associated with a particular actuation of a device can change during a duration of time. For example, a first song or sound may be played during the beginning of the actuation of the device, and then after a predetermined duration of time, a second song, sound, or volume change may be played. Although this portion of the invention has been described with respect to a turn signal, it can be appreciated that the sound parameters for any device or event can be programmed to the preference of the vehicle operator.

Illustrated in FIG. 1 there are a plurality of devices that can produce signals that are processed by the control unit to produce an associated sound. A driver operated switch 42 can be any mechanical or other switch that is actuated by the driver or other passenger of the vehicle. For example, such a switch can be a turn signal, windshield wipers control, fuel lid release, hazard light control, seat belt release, door handle, door locks, window controls, seat controls, etc. According to the present invention, when these driver operated switches 42 are actuated, a signal indicating the actuation is sent to the control unit 32 to be processed to determine what audio signal (as well as the actual function of the driver operated switch) is to be broadcast based on the audio data that is associated with the function of the actuated driver operated switch. For example, it can be appreciated that when certain driver operated switches 42 are actuated, it can be informative to the driver to be notified of such actuation, particularly in situations where the actuation occurs accidentally or continues to remain actuated beyond the time the operator wishes for the actuation to occur.

The conventional interface for a motor vehicle for user operated controls typically includes a switch or a switch array, which generally comprises a large number of switches, that is mounted in and around the armrests, console, and/or dashboard of the motor vehicle, such as the driver operated switches 42 described above. By convention, motor vehicles employ mechanical switches, which have physically moving (e.g., sliding) parts that create contact between conductors. In the preferred embodiment, a plurality of touch sensors 44 are implemented for use in a switch array for user operated controls. A preferred touch sensor is a filed effect sensor, however, it should be understood that other touch type sensors may be used for the touch sensors 44. The touch sensors 44 may be positioned behind a display panel having icons or indicators thereon. The touch sensors 44 can detect the presence of the user's finger when the user selects one or more of the icons/indicators on the display panel. As with the driver operated switches 42 described above, the signal sent from the touch sensors 44 to the control unit 32 can request the control unit to broadcast the audio data associated with the particular event that is sensed by the sensors. The touch sensors 44 also send a signal to the control unit. The function and operation of this is similar to that of the driver operated switch 42 in that a passenger or the driver of the vehicle has triggered the sensor in order to perform the function the sensor is designed to control. It can be appreciated that these sensors can be used to control or operate any device or apparatus within the passenger compartment and can act to replace any conventional mechanical switch (such as some of the driver operated switches 42 described above). Since many touch sensors provide little or no discernable feedback that the switch to be operated has been in fact actuated, providing an associated sound in conjunction with the operation of the switch can notify the user that the function requested has actually been performed. The touch switches are generally non-mechanical or non-movable touch cells or switches, such as, but not limited to, resistive, inductive, piezoelectric and capacitive switches. The touch sensor may be of the type described, for example, in U.S. patent application Publication No. 2002/0057020, published May 16, 2002, the description of which is incorporated herein by reference. However, it can be appreciated that any sensor switch can be used with the present invention.

Various sensors 40 associated with vehicle operation can also generate signals that are sent to the control unit 32. It is anticipated that sensors would be adapted to detect various operating conditions of the vehicle. As stated above, it can be advantageous for a driver or passenger to be notified when a vehicle condition is sensed. For example, a sensor could be used to identify when the vehicle tire pressure is low, there is a low fuel level, a door is ajar, the air filter needs replaced, maintenance is required, at the initial vehicle start, as well as any other vehicle operating condition. As with the driver operated switches 42 described above, the signal sent from these sensors to the control unit can request the control unit to broadcast the audio data associated with the particular event that is sensed by the sensors. In addition, sensors can be used to send signals to the control unit 32 that provide information about the positions of vehicle seats, mirrors and other devices or apparatuses that can be set by the operator of the vehicle. As will be described below, the data storage unit 50 can store positional data for the various mirrors and seats for ease in re-setting the positions of those apparatuses should they become changed. It should be apparent to one of ordinary skill in the art that any suitable sensor can be used for detecting the operating conditions and various apparatus positions of the vehicle.

As stated above, some of the vehicle settings that can be customized by a vehicle operator are the positions of auxiliary devices 48, such as seat assemblies, mirror assemblies, steering wheels, and pedal assemblies, which are generally collectively referred to as the. Examples of other customizable settings for an auxiliary device 48 include radio presets of an audio system and the color and/or intensity of light sources.

A feature that is often associated with power seats is a seat memory function, in which an occupant-desired seat location is readily re-established. A memory is utilized to store the desired seat location. Actuation of the seat memory function is typically via a memory switch located within the vehicle, on a key chain fob, or the like. Upon actuation of the seat memory function, according to the present invention, the control unit 32 may utilize a sensed input from a seat location sensor for determining the position of the seat, and then actuating the motor of the seat position actuator to move the seat to the desired position. A plurality of occupant-desired seat locations can be stored in the data storage unit 50. Thus, several vehicle users can take advantage of the seat memory function, with each user having their own seat location and position preferences stored. Similar positional information is capable of being stored and processed by the control unit 32 for other auxiliary devices 48 such as the mirrors, foot pedals, the steering wheel, etc. Thus, each of these devices 48 can then be operable by the control unit interface 30, the key chain fob, or other device. The actual mechanisms for moving any of the devices described above can be any suitable mechanisms, such as those that are known in the art.

As stated above, the vehicle interior preferably includes a control unit interface 30. The interface 30 preferably includes a display panel that displays visual information to occupants of the passenger compartment. The control unit interface 30 is preferably positioned such that the operator of the vehicle can access the control unit interface 30 while operating the vehicle. It should be appreciated that the control unit interface 30 can be located or mounted such that any person in the passenger compartment can access the control unit interface 30. The control unit interface 30 is preferably in communication with the electronic control unit 32 (also indicated schematically at 32 in FIG. 1).

The control unit interface 30 of the control unit 32 is configured to allow a user to input commands to control the operation of the control unit 32. The control unit interface 30 also communicates information regarding the operation of the control unit 32. The control unit interface 30 may include any number and type of controls including switches, buttons, track balls, and a touch screen device, or any combination thereof, to allow a user to input various commands. The user interface 30 of the control unit 32 may also include at least one LCD (liquid crystal display), or any other display device, to indicate such things as the command line and file contents of the data storage unit 50. The user interface may include a display that allows a user to select various displayed options using any of the controls of the control unit interface 30. Thus, the user can use the control unit interface 30 to associate saved audio data with any of the vehicle devices or events described above. With respect to vehicle seat positions (as well as mirror and other device positions), the control unit interface can be used to store the positions of the devices in the data storage unit 50 based on the sensor data that is sent to the control unit 32. The control unit 32 can also be used to check and modify any of these settings.

Thus, the control unit 32 is capable of modifying audio settings as well as non-audio settings according to the preferences of the driver, such as the seat positions, mirror positions, etc. based on driver inputs or sensed conditions as was described above. Since the audio data is associated with devices or events, the control unit can electronically modify associations therebetween. Control of the motor of a seat position actuator 19 can be responsive to manual actuation of switches that are typically located somewhere on the seat. Similarly, power operating units can be operatively connected with rear and side view mirrors, the steering wheel, and brake and accelerator pedals to electronically adjust the positions of those auxiliary devices 48. However, according to the present invention, the positions of the seats and other vehicle components can be moved using the actuators wherein the actuators are operated by the control unit 32 instead of being manually operated by the vehicle operator.

In the preferred embodiment, the operator can modify any of the saved data by accessing the control unit interface 30. The display of the interface can display information regarding the stored data, the status of the vehicle settings, or other information. The operator can then use the control interface 30 to change, reset, or delete any of the settings saved therein. Then, the operator can operate a "save" command so that the new settings are stored in the data storage unit 50. In addition, the data can also be simultaneously saved in a portable memory device (or optionally, only in one or the other), such as was described above.

In this embodiment, multiple user profiles can be established, each having unique user defined parameters for any of the variable vehicle settings described above. Thus, a driver can upload any number of audio data to the data storage unit 50. The driver can use the control unit interface 30 to associate the audio data with particular devices or events so that actuation of the device or occurrence of an event will cause the associated audio to play. Similarly, the driver can adjust various seat and other apparatus positions prior to saving the positional information in data storage unit 50. The driver can then associate the group of settings with a driver number (e.g., "Driver 1" through "Driver n") and effecting the "save" operation described above. This step can be repeated for any number of drivers or group of settings. The information can be recalled by several means.

It is preferred that a driver identification device 38 is used to recall the saved user settings when a driver desires to have the vehicle settings changed to those preferences. In one embodiment, the control unit interface 30 can be accessed by, for example, the user depressing a memory preset button to alert the control unit as to which settings the customizable parameters are to be recalled. Alternatively, a key fob based transmitter or other suitable transmitting device can be used to communicate with the control unit so that when the key fob is brought into the range of which a sensor of the control unit can read, the control unit recognizes the operator and automatically defaults to the identified operator's profile that includes the driver's preferences and settings (seat and mirror positions, and audio data associations). It can be appreciated that an ignition key or other device can also contain user identification data that will cause the control unit to recall the driver profile from the data storage unit 50. Alternatively, voice, fingerprint, or retinal matching, or other biometric identification technology, can be used to associate a user profile with a particular vehicle user. In addition, the operator could input physical characteristics such as height, etc. using the control unit interface and the seat, pedal, and mirror positions can be automatically adjusted to a predetermined position based on preset positioning data.

In an alternate embodiment, a memory device such as a portable memory card or memory stick, Bluetooth or other wireless device, can transmit data to the control unit on a "per use" basis. That is, when a vehicle operator inserts a memory card into the control unit interface, connects an external device to the communication port, or the wireless device is brought within the range of the sensing mechanism adapted to read the wireless device data, the data on the storage device is transmitted to the control unit 32. The processing unit of the control unit 32 then processes the read data and customizes any of the preprogrammed parameters of the vehicle based on the data. When the vehicle operator removes the storage device from the control unit interface, the customizable parameters may return to a default setting. In this manner, no internal memory device for the control unit and processing unit is required. Thus, the portable memory device may function as the data storage unit 50, the input device 36, or both the data storage unit 50 and the input device 36.

It can be appreciated that the control unit interface can have a remote control attachment (not shown). The remote control attachment may be any device suitable to facilitate remote communicable connection of the remote control attachment to the control unit 32, such as an infrared, optical or other wireless device. It is contemplated that the remote control attachment could additionally or alternatively control the control unit 32 to modify, set, or delete settings contained in the data storage unit 50.

The processing means of the control unit 32 will now be described next. The processing means of the control unit 32 preferably includes a microprocessor, which may be any suitable microprocessor device. The microprocessor is communicably connected to the data storage unit, and may read and write data to the storage unit. An I/O controller is communicably connected to the microprocessor. The input and output of the microprocessor is controlled by the I/O controller. The I/O controller is also communicably connected to the communication interface 30, the hard drive, the communications port, a display/input processor, and a data storage device 50, such as flash memory. The display/input processor manages the data transferred to and input received from the user interface. It will be appreciated that the I/O controller and the display/input processor may be combined into a single device. A DSP (digital signal processor) may be communicably connected to the microprocessor, although such is not required. It will be appreciated that the microprocessor may be capable of performing the operations described herein of the DSP without a separate DSP device. Further, it is contemplated that the microprocessor and the DSP may be integrated into a single device. The DSP is controlled by the microprocessor. The DSP can retrieve digitally compressed data from the memory, the memory connection, and the compact disc drive, the hard drive, and the communications port via the I/O controller. The DSP runs a decompression algorithm on the digitally compressed data that is input from the input device 36 or the audio data that is stored in the data storage unit. The DSP then outputs the decompressed data to a DAC (digital-to-analog converter). The DAC converts the data into an analog signal, and transmits the analog signal to an amplifier. The amplifier boosts the strength of the signal and transmits the analog signal to the audio output device 46.

The audio output device 46 may be any suitable output device capable of conveying an audio signal produced by the processing means, including traditional output jacks for communicable connection with amplification devices such as earphones or other speakers. It can be appreciated that the audio output device can also include a micro speaker that is positioned within particular devices. For example, the sounds associated with the turn signal can be played from within the turning stalk, or within the instrument panel in conjunction with a lighted display indicating a left or right turn. In an alternate embodiment of the invention, the audio output can be conveyed over the audio system of the vehicle or via any suitable audio emitting device such as the main speakers of the vehicle. In the embodiment wherein the audio output is conveyed over the audio system of the vehicle, the control unit is preferably in communication with the audio system such that the control unit can mute or lower the volume of the audio system so that the audio notification of the customized vehicle settings can be heard. Additionally, this can also act to notify the driver when, for example, the turn signal remains on after a vehicle turn or lane change has been made.

As described above, the input device may include any memory device suitable for storing digital data. The input device 36 may be any memory device, including a magnetic, optical, or removable flash memory device. There are many different methods of programming the data for customizing the parameters of the vehicle. In the preferred embodiment, a user can upload data, such as from the Internet or any other database, to any of the input devices described above. This can be done by any suitable mechanism such as via a PC, wireless device, PDA, MP3 player, etc. In this embodiment, the control unit may be programmed by the vehicle dealership. Thus, the dealership can pre-program the control unit for the driver, or make available input devices (memory chips) that include audio data. The input devices made available by dealerships can also include excess memory such that the vehicle user can add data (such as seat and mirror positional information) to the input device.

In an alternate embodiment, data can be programmed by manually setting vehicle parameters (seats, mirrors, etc.) and saving them. This embodiment would most likely include the control interface being adapted to display a list of audio sounds for the user to select and assign to the various customizable parameters. Alternatively, the user can select from a plurality of themes such that a selected theme will have predetermined sounds/settings that relate to each other in some manner. The operator could also be able to select a theme and then customize individual settings within the theme. It is preferred that the themes are preprogrammed by the vehicle manufacturer or dealer. However, it can be appreciated that user can also create their own themes as desired.

In accordance with the provisions of the patent statutes, the principle and mode of operation of this invention have been explained and illustrated in its preferred embodiment.

However, it must be understood that this invention may be practiced otherwise than as specifically explained and illustrated without departing from its spirit or scope.

What is claimed is:

1. A system for customizing vehicle settings for vehicular input sources and auxiliary devices, said system comprising:
   a control unit adapted to communicate with a vehicle input source and an auxiliary device; and
   a data storage device in communication with said control unit for storing and retrieving audio electronic data for customizing sounds related to actuation of the vehicle input source, said data storage device further capable of storing and retrieving non-audio electronic data for customizing settings for the vehicle auxiliary device;
   wherein said control unit is adapted to communicate with at least one input device for uploading the audio and non-audio data stored in said data storage device.

2. The system of claim 1 further including a control unit interface for controlling said control unit to change a first sound from said audio data associated with the actuation of the vehicle input source to a second sound.

3. The system of claim 1, further including a vehicle auxiliary device.

4. The system of claim 3, wherein said auxiliary device is one of a seat assembly, a mirror assembly, a steering wheel assembly, a light source, and an audio system.

5. The system of claim 1 further including an audio output device in communication with said control unit for outputting an audio signal of the audio data.

6. The system of claim 1, further including an input source in communication with said control unit.

7. The system of claim 6, wherein said data input source includes one of a personal computer, a cellular phone, and compact disc player.

8. The system of claim 6, wherein said data input source is a sensor.

9. The system of claim 8, wherein said sensor includes at least one of a touch sensor device, an optical sensor, a magnetic sensor, a Hall Effect device, a Piezo device, and a photoelectric device.

10. The system of claim 6, wherein said data input source is a field effect sensor.

11. The system of claim 6, wherein said data input source is a driver operated switch.

12. The system of claim 6, wherein said data input source is a driver identification device.

13. The system of claim 1, wherein the non-audio data includes information regarding one of a seat position, a mirror position, a steering wheel position, a pedal position, a radio preset, a color of a light source, and an intensity of a light source.

14. The system of claim 1, wherein said input device and data storage device are integrated together.

15. The system of claim 1, wherein said data storage device is capable of storing data on a removable portable media device.

16. The system of claim 1, further including a data input device in communication with said control unit for uploading at least one of the audio and non-audio data stored in said data storage device.

17. The system of claim 16, wherein said input device is capable of storing data on a removable portable media device.

18. The system of claim 16, wherein said input device is in communication with said control unit via a wireless connection.

19. A system comprising:
   an auxiliary device having multiple settings;
   an audio output device;
   a vehicle input source, wherein actuation of said vehicle input source causes a sound to be emitted from said audio output device for alerting an operator of the system of the actuation of said vehicle input source;
   a control unit in communication with said auxiliary device, said audio output device, and said vehicle input source;
   a data storage device in communication with said control unit for storing and retrieving audio data for producing said sound, said data storage device further storing and retrieving non-audio data for customizing the settings of said auxiliary device;
   an input device for uploading audio and non-audio data stored in said data storage device data; and
   an interface in communication with said control unit for changing said audio data of said sound with a second audio data uploaded from said input device.

20. The system of claim 19, wherein said control unit is operable to store first and second user settings in said data storage device of audio and non-audio data different from one another, said system further including a driver identification device in communication with said control unit, wherein said driver identification device is operable to select one of said first and second user settings.

* * * * *